(12) United States Patent
Lim

(10) Patent No.: US 6,760,437 B1
(45) Date of Patent: Jul. 6, 2004

(54) ANALOG MODEM OVERCURRENT PROTECTION

(75) Inventor: Wi-Cher Lim, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/148,357

(22) Filed: Sep. 4, 1998

(51) Int. Cl.[7] .......................... H04M 19/00; H02H 9/02
(52) U.S. Cl. ................. 379/412; 379/395.01; 361/57; 361/119
(58) Field of Search ............... 361/119, 57; 369/93.9; 379/412, 395.01

(56) References Cited

U.S. PATENT DOCUMENTS

| | | | |
|---|---|---|---|
| 4,408,248 A | * | 10/1983 | Bulley et al. ............. 361/119 |
| 5,369,666 A | | 11/1994 | Folwell et al. ............ 361/119 |
| 5,532,898 A | * | 7/1996 | Price ......................... 361/100 |
| 5,604,785 A | * | 2/1997 | Pryor et al. ................ 324/522 |
| 5,696,660 A | | 12/1997 | Price ......................... 375/222 |
| 6,418,222 B2 | * | 7/2002 | Wong et al. ............... 379/412 |
| 2001/0001619 A1 | * | 5/2001 | Wong et al. ............... 379/387 |

OTHER PUBLICATIONS

Motorola, Single Chip 300–Baud Modem with DTMF Transceiver, Document MC145446A/D, Jul. 1996, p. 13.*

* cited by examiner

*Primary Examiner*—Minsun Oh Harvey
*Assistant Examiner*—Daniel Swerdlow

(57) ABSTRACT

An overcurrent protection circuit for an analog modem which uses passive-device features during normal operation to minimize modem signal noise and distortion, and active-device features when inadvertently connected to a line having excessive line current.

22 Claims, 2 Drawing Sheets

ANALOG MODEM OVERCURRENT PROTECTION

BACKGROUND AND SUMMARY OF THE INVENTION

The application is related to modem protection circuits.

Background: The Mobile Workplace

Advances in portable computing have enhanced the mobile work environment allowing persons to work and communicate with home or office from nearly any location. Hotels and other businesses catering to the mobile computer user seek ways to lure in the business by perhaps installing the latest in telecommunications systems for the business traveller. For example, some hotels are now providing digital Private Branch exchange ("PBX") telephone lines into hotel rooms instead of the traditional analog telephone systems. PBX systems provide a telephone system with many more enhancements (e.g. messaging and call queuing) than an analog system while reducing the number of cables required to handle the communications.

Background: Analog and Digital Phone Systems

All standard analog telephone systems provide a direct-current signal to each phone. To alert the end-user to an incoming call, a ring current is sent over the wires to energize, typically, an audible device (e.g. ringer for a bell). When the handset is picked up, a switch closes in the telephone and a current (called the tip current) flows over the wires. Equipment at the central office detects the current, and listens for the touch tones entered by the person dialing the number. The telephone company typically places approximately 48 volts across the tip and ring leads, but the current is limited by a resistance of 400 to 1750 ohms placed in series with the 48-volt source. Therefore, the resulting line current is usually less than. approximately 120 mA and, in most cases, the telephone company limits the current, to 60 mA or less.

Digital phone systems work differently. Like a LAN, a PBX communicates in digital pulses with the desk set. Because a PBX provides the power to run the microcontroller and other features in the desk set, more current is typically available on the phone lines. In a PBX digital system, a DC voltage is applied across the tip and ring leads—typically in the range of 12 to 90 volts. However, the current from the supply is not limited and may typically exceed 90 mA.

Background: Modems and Standards

In some ways, modems act just like traditional telephones: an internal switch connects tip and ring together. This switch is typically an electromechanical relay in most modems. PC Card modems, however, are much smaller and cannot accommodate the electromechanical relay, so solid-state relays are used. The relay is designed to dissipate heat from a 60-mA current and to withstand the higher AC voltages from a ring signal.

Digital systems typically use higher voltages and currents which are destructive to the analog modem. Most PC Card modems cannot dissipate the additional heat caused by the higher currents used in digital telephone systems. Consequently, the part of the modem circuitry that connects to the phone line is rendered inoperable, leaving the rest of the modem operating normally. This presents a problem to a user with a portable computer, for example, which typically includes the more common analog modem. The analog modem can only withstand analog line currents. This would not normally be of concern, except that there is no visible distinction between a digital telephone wall plug and an analog plug.

The way in which modems connect to the public telephone system has been largely standardized. This standardization is due to the need for telephonic systems to be compatible and interchangeable. The standard connector used in the United States is an RJ-11, 6-pin modular plug or receptacle. A typical wall telephone jack is an RJ-11 receptacle designed for interfacing to telephone or modem systems. Unfortunately for the analog modem user, a PBX digital system may also employ an RJ-11 receptacle in a wall jack, with no discernable difference. An unwary user would plug the analog modem into the digital jack and very quickly blow out a fuse in the modem, leaving it inoperable.

Background: Conventional Protection Methods

Common approaches use passive recoverable fuses in the analog modem front-end to open the circuit. Other more costly techniques may use active devices to control the current. Two considerations which must be addressed are the use of passive or active protection devices. An analog modem not constructed to withstand the high current associated with digital systems will not hold up long enough for a passive recoverable fuse-device to act. On the other hand, it is preferable to have a passive device for current control to minimize distortion on modem signal when operating under normal conditions.

Several modem manufacturers are integrating safeguards that prevent the modem fuse from being blown. For example, Hayes Microcomputer Products installs high-current resistors in PC Card modems to provide a "comfort factor" for users. For another example, Megahertz uses a C40 chipset which includes a Digital Line Guard that disconnects the modem when the current exceeds 125 mA.

Analog Modem Protection Circuit Against Digital Line Current

The application discloses an architecture for protecting telecom units against overcurrents. The architecture is particularly advantageous for preventing the destruction of an analog modem which has been plugged into a digital telephone system which uses current and voltages destructive to the modem. A main feature of this protective circuit is that it appears purely resistive under normal operating conditions. Therefore, the voltage-current characteristics are linear which results in a flat response across the voice band frequencies. The active devices provide a shunt path for overcurrents, but are not connected in the series path. Active devices also provide a fast response to overcurrent conditions. Preferably, the circuit also incorporates a resettable fuse as last-resort protection against substantial overcurrents not protected against by the active device circuit.

The invention has the principal advantage of using passive-device features which minimize noise and distortion of the modem signals under normal operating conditions.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE
PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Modem Protection Circuit

Figure 1:
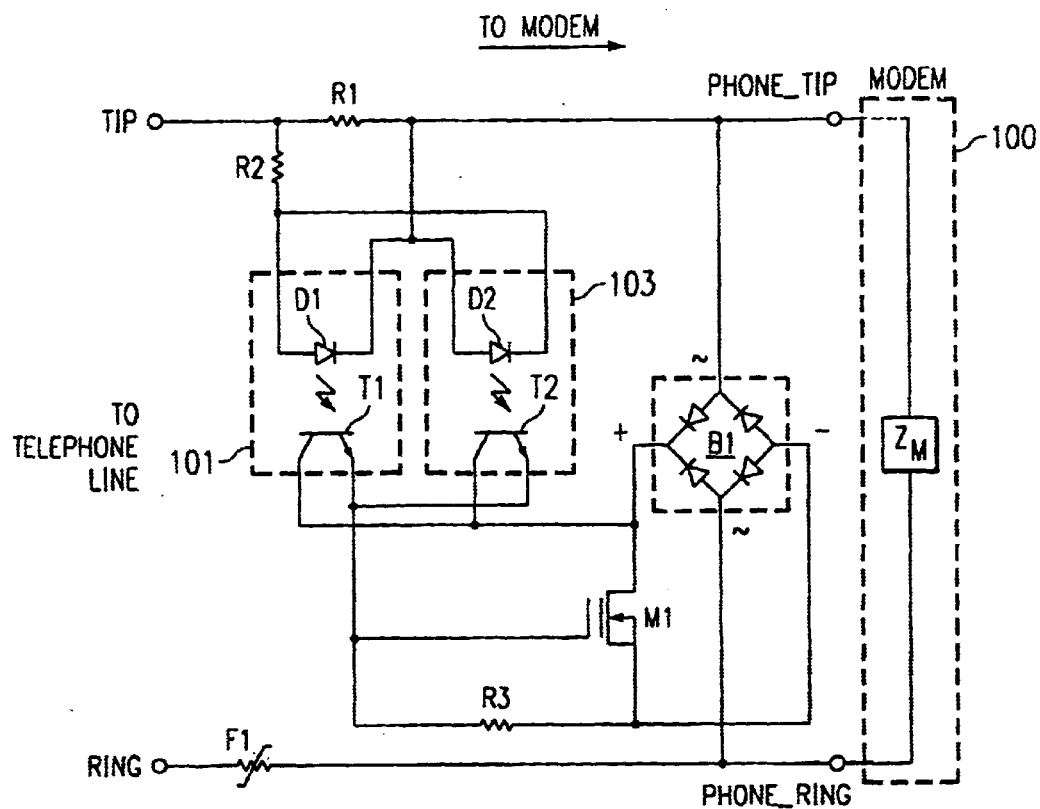
FIG. 1 shows a circuit diagram of the presently preferred embodiment.

The innovative modem protection circuit provides overcurrent protection using passive-device features for protection during normal operation to minimize noise and distortion. FIG. 1 shows a circuit diagram of the presently preferred embodiment. The protection circuit shunts large currents at the modem input. A main feature of this protective circuit is that it appears resistive under normal operating conditions. Therefore, the voltage-current characteristics are linear, which results in a flat response across the voice band frequencies. Furthermore, the protection circuit provides active-device features for protection when destructive voltage and current levels are present.

In this embodiment, the protection circuit uses photovoltaic relays (101 and 103) to provide overcurrent detection. A rectifying circuit B1 (e.g. diode bridge) is provided to convert the tip-ring AC voltage to DC for use with MOSFET transistor M1.

For a loop current through resistor R1 less than approximately 120 mA, no current flows through either of the photocoupler diodes (D1 and D2). Consequently, MOSFET transistor M1 will not conduct. Therefore, the modem 100 having an internal impedance $Z_M$ receives all of the current. For loop currents greater than 120 mA, and depending on the polarity of the tip-ring voltage, one of the photocoupler diodes (D1 and D2) conducts and turns ON its respective output phototransistor (T1 or T2). The respective output phototransistor then conducts a small current to turn ON transistor M1, which in turn shunts most of the current. When the loop current exceeds approximately 200 mA, the resettable fuse F1 trips. As the loop current drops below approximately 120 mA, M1 switches OFF and the modem 100 maintains the trip state current.

Values for circuit components may approximate the following: R1=9.1 Ω, R2=22.6 Ω, R3=10K Ω, the diode bridge is a model MB4S by General Instrument, the transistor M1 is a model BS126 by Phillips, the resettable fuse F1 is model RXE017 and made by Raychem, and the photovoltaic device is a model TLP628 by Toshiba.

Protection Circuit Variation

Figure 2:
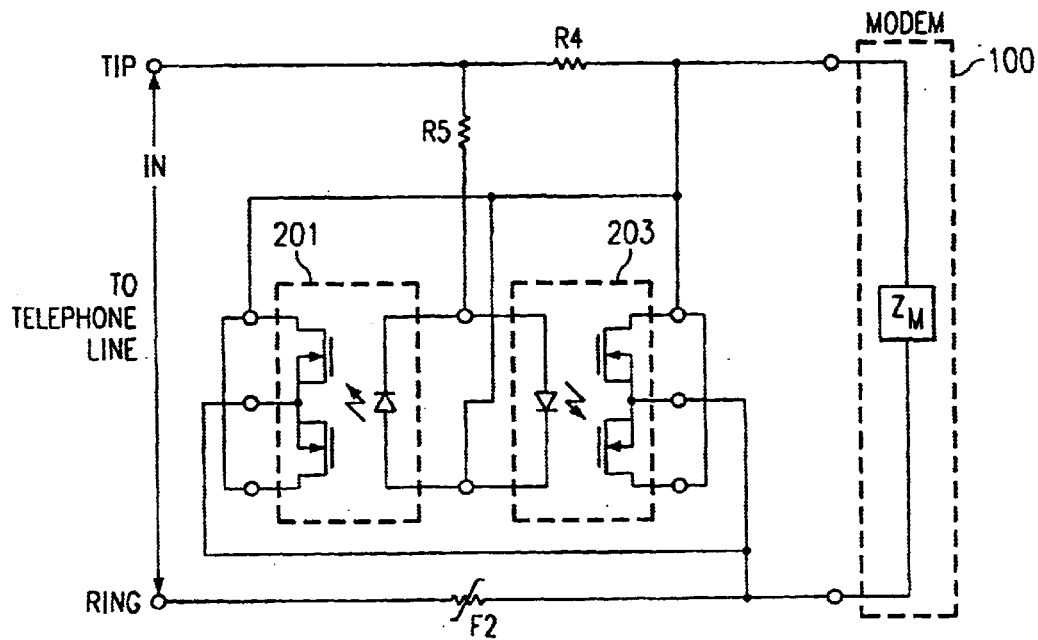
FIG. 2 shows an alternative protection circuit.

FIG. 2 shows an alternative protection circuit. The relays (201 and 203) in this variation are model PVT312 devices manufactured by International Rectifier. For a large tip voltage presented at the tip terminal TIP, a majority of the tip voltage is dropped across resistor R5, generating a sufficient current to turn ON optocoupler 203. The remaining current (through R4) is routed through the transistors of optocoupler 203 (the path of least resistance) back through the resettable fuse F2 to the ring terminal RING. For current of 136 mA and above, optocoupler 203 turns on, shorting out the modem 100, and effectively protecting the analog modem by taking it out of the circuit.

For an excessive ring current presented at the ring terminal RING, the resettable fuse F2 will trip when its ratings are exceeded. If the current is such that it does not exceed the rating of the fuse F2, optocoupler 203 turns ON. The holding voltage is sustained by current path through the modem, if it is still in an "off-hook" condition.

Forward current of either of the optocouplers (201 and 203) is a minimum 2 mA with a maximum of 25 mA. Forward voltage of either optocoupler is approximately 1.2 V. The working voltage of either optocoupler is approximately 250 V which will survive ring voltages (which may reach, e.g., 90–100 volts DC in a digital regime). Maximum load current of an optocoupler is 320 mA, which will survive the digital loop current (which may exceed 90 mA). The circuit gives no interference up to 120 mA through a 10 ohm resistor. The worst case ring current is 33 mA, which does not generate enough voltage to activate the optocoupler 203.

Modem Protection Adapter

Figure 4:
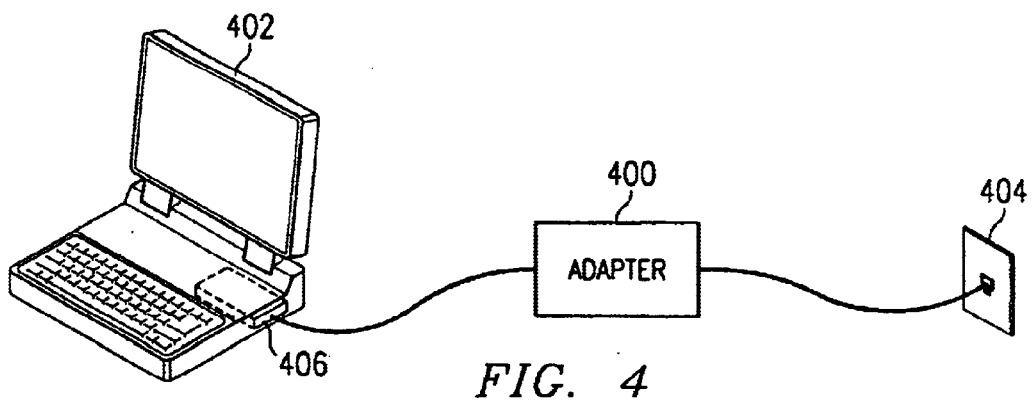
FIG. 4 shows a block diagram of a portable computer connected to an adapter according to the presently preferred embodiment.

In one class of innovative embodiments, the innovative protection circuit is encased in the form of a standalone module adapter and connected between the incoming telephone signal and the modem, as shown in FIG. 4. In this particular illustration, the adapter 400 is placed between a portable computer 402 (with an internal modem 406) and telephone jack 404 (providing the telephone line signal). The adapter has an RJ-11 plug which connects to the modem, and an RJ-11 receptacle which accommodates the incoming telephone line from the wall plug.

General Modem Features

Figure 3:
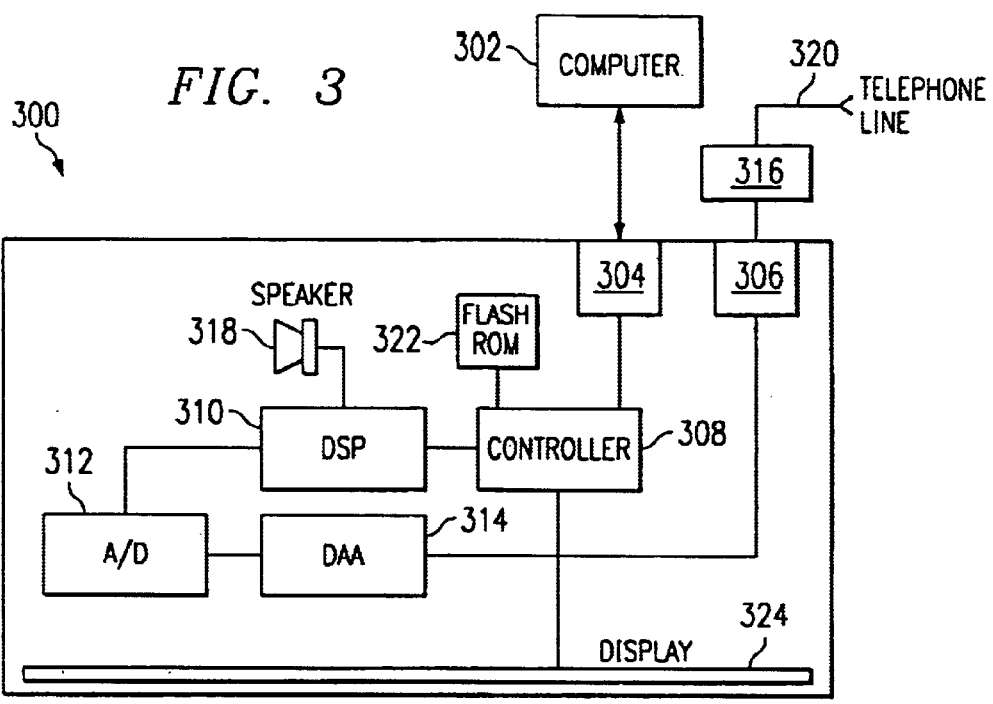
FIG. 3 shows a block diagram of a modem.

FIG. 3 shows a block diagram of a basic modem. A modem 300 (external in this example) is connected to a computer 302 through a serial connection 304. The innovative protection circuit 316 may be contained in a module which is interposed between the modem and the telephone line 320. The other modem connection 306 provides the interface to the protection circuit 316. The modem connection 306, and the connection to the telephone line 320, are typically RJ-11 connectors. As mentioned before, the telephone line 320 may provide connection to a PBX digital system carrying voltage and current levels which are destructive to input circuitry of the analog modem 300. The modem 300 may comprise a controller 308 which controls the transfer of data from the computer 302 to the modem 300, and all of the modem's basic functions. It can also operate the modem's LED or LCD display 324, if available, to show the status of various functions. The controller 308 may also connect to a memory 322 (e.g. flash ROM) which is software upgradeable for new technology and feature updates. A digital signal processor ("DSP") 310 is provided to manipulate different types of information received from the controller 308, including sound that has been converted to digital form. It may also drive a speaker 318 to emit audible tones which the user may hear for perhaps diagnostic purposes or general operational functions. An analog-todigital converter ("A/D") 312 receives the analog output of the DSP 310 and digitizes the signal for input to a Data Access Arrangement ("DAA") circuit 314. The DAA 314 is a telephone line interface circuit which provides an impedance match between the modem and the telephone line connection 320.

Alternative Embodiment: Protection Circuit Internal to Modem

Figure 5:
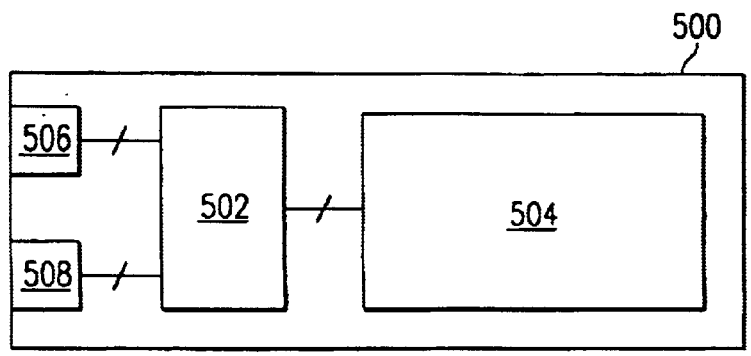
FIG. 5 shows an alternative embodiment where the protection circuit is a contiguous part of the modem circuitry.

FIG. 5 shows an alternative embodiment where the protection circuit is contiguous with the modem circuitry. Circuit board 500 comprises a modem circuitry section 504 which handles all modem functions. The protection circuit 502 is engineered onto the same board 500 as the modem circuitry 504, and provides overcurrent protection from excessive currents presented at either of the input/output telephone connections (506 and 508). The circuit board 500 may be that which, for example, is used either in an external modem configuration, or an internal modem configuration where the modem is inserted into a computer chassis (e.g. PCMCIA card, or internal bus adapter card).

According to a disclosed class of innovative embodiments, there is provided: an overcurrent protection circuit for an analog modem, comprising: an input for receiving a telecommunications channel; an output operatively connected to pass through signals from said telecommunication channel; and a shunting circuit for shunting overcurrent from said telecommunications channel, said shunting circuit comprising active devices; wherein no said active devices are connected in series between said input and said output.

According to another disclosed class of innovative embodiments, there is provided: an overcurrent protection circuit for an analog modem, comprising: an input for receiving a telecommunications channel; an output operatively connected to pass through signals from said telecommunication channel; and a shunting circuit for shunting overcurrent from said telecommunications channel, said shunting circuit comprising at least one photo-sensitive element; a rectifying circuit; and a switching element; wherein no active devices are connected in series between said input and said output.

According to another disclosed class of innovative embodiments, there is provided: an analog modem, comprising: an input for receiving a telecommunication channel; an output operatively connected to pass through signals from said telecommunication channel; a translation circuit for receiving signals from said output and translating said signals into a computer-readable format; and an overcurrent protection circuit, comprising a shunting circuit for shunting overcurrent from said telecommunications channel, said shunting circuit comprising active devices; wherein no said active devices are connected in series between said input and said output.

According to another disclosed class of innovative embodiments, there is provided: a method of overcurrent protection for an analog modem, comprising the steps of: (a.) receiving a telecommunications channel at an input of said protection circuit; (b.) operatively connecting to an output to pass through signals from said telecommunications channel; (c.) shunting overcurrents from said telecommunications channel with a shunting circuit, said shunting circuit comprising active devices; wherein no said active devices are connected in series between said input and said output.

According to another disclosed class of innovative embodiments, there is provided: a method of overcurrent protection for an analog modem, comprising the steps of: (a.) receiving a telecommunications channel at an input of said modem; (b.) operatively connecting to an output to pass through signals from said telecommunications channel; (c.) shunting overcurrents from said telecommunications channel with a shunting circuit, said shunting circuit comprising active devices; and (d.) translating said signal into a computer-readable format; wherein no said active devices are connected in series between said input and said output.

According to another disclosed class of innovative embodiments, there is provided: a method of overcurrent protection for an analog modem, comprising the steps of: (a.) receiving a telecommunications channel at an input of said protection circuit; (b.) operatively connecting to an output to pass through signals from said telecommunications channel; and (c.) shunting overcurrents from said telecommunications channel with a shunting circuit, said shunting circuit comprising at least one photo-sensitive element; a rectifying circuit; and a switching element; wherein no active devices are connected in series between said input and said output.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

What is claimed is:

1. An overcurrent protection circuit, comprising:

an input for receiving a telecommunications channel;

an output operatively connected to pass through signals from said telecommunication channel to a modem; and a shunting circuit for shunting overcurrent from said telecommunications channel, said shunting circuit consisting essentially of a first photo-sensitive element and a second photo-sensitive element coupled across the telecommunications channel; wherein no active devices are connected in series between said input and said output.

2. The circuit of claim 1, wherein the first photo-sensitive element and the second photo-sensitive element are photo-voltaic relays.

3. The circuit of claim 1, wherein said shunting circuit appears purely resistive under normal operating conditions.

4. The circuit of claim 1, further comprising a fuse in series with said input for limiting current in excess of that which can be shunted by said shunting circuit.

5. An analog modem, comprising:

an input for connection to a telecommunication channel;

an output operatively connected to pass through signals from said telecommunication channel;

a translation circuit for receiving signals from said output and translating said signals into a computer-readable format; and an overcurrent protection circuit, comprising a shunting circuit for shunting overcurrent from said telecommunications channel, said shunting circuit consisting essentially of a first photovoltaic device and a second photovoltaic device coupled across the telecommunication channel; wherein no said active devices are connected in series between said input and said output.

6. The circuit of claim 5, wherein the first photovoltaic device and the second photovoltaic device are photovoltaic relays.

7. The circuit of claim 5, wherein said shunting circuit appears purely resistive under normal operating conditions.

8. The circuit of claim 5, further comprising a fuse in series with said input for limiting current in excess of that which can be shunted by said shunting circuit.

9. A method of overcurrent protection for an analog modem, comprising the steps of:

receiving a telecommunications channel at an input of a protection circuit;

operatively connecting said input to an output to pass through signals from said telecommunications channel to the modem;

shunting overcurrents from said telecommunications channel with a shunting circuit, said shunting circuit consisting essentially of a first photo-sensitive element and a second photosensitive element coupled across the telecommunications channel; wherein no active devices are connected in series between said input and said output.

10. The method of claim 9, wherein the first photo-sensitive element and the second photo-sensitive element are photovoltaic devices.

11. The method of claim 9, wherein said shunting circuit appears purely resistive under normal operating conditions.

12. The method of claim 9, further comprising passing said input through a fuse for limiting current in excess of that which can be shunted by said shunting circuit.

13. The method of claim 9, wherein said first photo-sensitive element and said second photo-sensitive element are photovoltaic relays.

14. The method of claim 9, wherein said protection circuit comprises a rectifying circuit that is a diode bridge.

15. A method of overcurrent protection for an analog modem, comprising the steps of:

receiving a telecommunications channel at an input of said modem;

operatively connecting said input to an output to pass through signals from said telecommunications channel to the modem;

shunting overcurrents from said telecommunications channel with a shunting circuit, said shunting circuit consisting essentially of a first photovoltaic device and a second photovoltaic device coupled across the telecommunications channel; and demodulating said signals into a computer-readable format; wherein no said active devices are connected in series between said input and said output.

16. The method of claim 15, wherein the first photovoltaic device and the second photovoltaic device are photovoltaic relays.

17. The method of claim 15, wherein said shunting circuit appears purely resistive under normal operating conditions.

18. An overcurrent protection circuit, consisting essentially of:

a tip line coupled between a first conductor of a communications line and a first conductor of a modem;

a ring line coupled between a second conductor of the communications line and a second conductor of the modem; and one of a first photovoltaic device and the first photovoltaic device along with a second photovoltaic device connected between the tip line and the ring line.

19. The circuit of claim 18, wherein no active devices are connected in series between the modem and the communications line.

20. The circuit of claim 18, wherein the overcurrent protection circuit appears purely resistive under normal operating conditions.

21. The circuit of claim 18, wherein the communications line is connected to a private branch exchange.

22. The circuit of claim 18, wherein the photovoltaic device is an optocoupler.

* * * * *